United States Patent
Okamoto

(10) Patent No.: US 11,525,039 B2
(45) Date of Patent: Dec. 13, 2022

(54) ORGANIC-INORGANIC COMPOSITE PARTICLES AND METHOD FOR PRODUCING SAME

(71) Applicant: Ube Exsymo Co., Ltd., Tokyo (JP)

(72) Inventor: Naoki Okamoto, Tokyo (JP)

(73) Assignee: Ube Exsymo Co., Ltd., Tokyo (JP)

( * ) Notice: Subject to any disclaimer, the term of this patent is extended or adjusted under 35 U.S.C. 154(b) by 423 days.

(21) Appl. No.: 16/490,724

(22) PCT Filed: Mar. 5, 2018

(86) PCT No.: PCT/JP2018/008380
§ 371 (c)(1),
(2) Date: Sep. 3, 2019

(87) PCT Pub. No.: WO2018/164067
PCT Pub. Date: Sep. 13, 2018

(65) Prior Publication Data
US 2020/0002480 A1    Jan. 2, 2020

(30) Foreign Application Priority Data

Mar. 7, 2017    (JP) .............................. JP2017-042761

(51) Int. Cl.
| C08G 77/08 | (2006.01) |
| C08G 77/20 | (2006.01) |
| C08J 7/12 | (2006.01) |
| C08L 83/06 | (2006.01) |

(52) U.S. Cl.
CPC .............. *C08G 77/08* (2013.01); *C08G 77/20* (2013.01); *C08J 7/12* (2013.01); *C08L 83/06* (2013.01); *C08L 2203/20* (2013.01); *C08L 2205/18* (2013.01)

(58) Field of Classification Search
CPC ....... C07F 7/1804; C08G 77/08; C08L 83/06; C08L 2205/18
See application file for complete search history.

(56) References Cited

U.S. PATENT DOCUMENTS

2005/0261380 A1* 11/2005 Suzuki ................... C08G 77/14
516/77

FOREIGN PATENT DOCUMENTS

| CN | 1423154 A | 6/2003 |
| CN | 1738850 A | 2/2006 |
| CN | 104718241 A | 6/2015 |
| JP | H07140472 A | 6/1995 |
| JP | H08225625 A | 9/1996 |
| JP | 2002080598 A | 3/2002 |
| JP | 2003043494 A | 2/2003 |
| JP | 2004047343 A | 2/2004 |
| JP | 2004224876 A | 8/2004 |
| JP | 2004262981 A | 9/2004 |
| JP | 2004292644 A | 10/2004 |
| JP | 2004339296 A | 12/2004 |
| JP | 2004339297 A | 12/2004 |
| JP | 2008088430 A | 4/2008 |
| JP | 2010260881 A | 11/2010 |

OTHER PUBLICATIONS

First Office Action issued in Taiwanese Patent Application No. 107107706 dated Jul. 28, 2021.
Extended European Search Report issued in EP 18764057.8 dated Nov. 23, 2020.
Office Action issued in Chinese Patent Application or Publication No. 201880015075.3 dated Apr. 9, 2021.

* cited by examiner

*Primary Examiner* — Kuo Liang Peng
(74) *Attorney, Agent, or Firm* — Fox Rothschild LLP; Robert J. Sacco; Carol E. Thorstad-Forsyth

(57) ABSTRACT

The present invention provides organic-inorganic composite particles of which the creep deformation is further suppressed; and a method for producing the same. Organic-inorganic composite particles 10 include a compound having a siloxane bond and has a particle diameter d0, and when a load is applied such that an amount of displacement Ds satisfies $0.08d0 \leq Ds \leq 0.15d0$ and is held for 180 seconds, conditions of the following Formulae (1) and (2) are satisfied:

$$(D180-Ds)/d0 \leq 1\% \quad \text{Formula(1); and}$$

$$(Dmax-Ds)/d0 \leq 1\% \quad \text{Formula (2),}$$

wherein d0 is an average particle diameter, D180 is an amount of displacement of the particle diameter after 180 seconds of application of the load, and Dmax is the maximum amount of displacement of the particle diameter during the 180 seconds.

13 Claims, 1 Drawing Sheet

ORGANIC-INORGANIC COMPOSITE PARTICLES AND METHOD FOR PRODUCING SAME

TECHNICAL FIELD

The present invention relates to organic-inorganic composite particles and a method for producing the same.

BACKGROUND ART

Generally, a gap material (spacer) is used when a distance between two components such as substrates in an electronic member is controlled so as to be fixed. In particular, in a liquid crystal display element such as a liquid crystal display (LCD) and a polymer dispersed liquid crystal (PDLC) film and in an organic EL display (OLED), a spacer with a micron order and a high precision is demanded from a design viewpoint. In such electronic members, a fine particle such as a resin particle and a silica particle is used as the spacer.

In recent years, in electronic members, particularly in the liquid crystal display elements, miniaturization, thinning or narrowing of a frame has been progressing. Along with this, there is an increasing requirement for highly precise and flexible spacers so as not to damage the wiring of the substrate.

Both the resin particle and silica particle are not sufficient to satisfy the above requirement. The resin particle has flexibility, but when a large load is applied thereto, plastic deformation occasionally occurs. For example, in the liquid crystal display element, it is concerned that the unevenness of a distance is formed between two substrates and a displayed image quality lowers. In addition, the resin particle is generally poor in a precision of the particle diameters, which has occasionally affected the gap precision as well.

On the other hand, the silica particle is excellent in the precision of the particle diameters, and the gap precision is higher than that of the resin particle. However, the silica particle is too hard and may affect the wiring, and accordingly there is the case where the silica particle cannot be used as the spacer. In addition, the silica particle occasionally causes damage when a sudden impact has been applied thereto.

Thus, the resin particle is poor in the precision of the particle diameters, and the silica particle does not have the flexibility. Then, an organic-inorganic hybrid particle represented by polyorganosiloxane is considered to be promising as the spacer. The organic-inorganic hybrid particle has the precision of the particle diameters comparable to the silica particle, in addition to the flexibility of the resin particle.

As for the organic-inorganic hybrid particle which is used for a spacer for a liquid crystal display panel, an organic-inorganic composite particle is disclosed (for example, Patent Literature 1) that contains polysiloxane having an organosilicon in which at least one carbon atom in an organic group is directly chemically bonded to a silicon atom in its molecule, as a main component, and a residual displacement after 10% deformation is 5% or smaller.

As for a spacer for a liquid crystal display element having a small amount of plastic deformation at the time when the spacer has held a compressive load, a spacer for a liquid crystal display element is proposed (for example, Patent Literature 2) in which a ratio ($\Delta L/R$) of an amount $\Delta L$ of movement of an indenter in a predetermined time period during which the spacer holds a load to a particle diameter R of the particle is specified to be 0.02 or smaller.

As for an elastic fine particle which is used for a spacer between substrates such as touch panels, a fine particle is disclosed (for example, Patent Literature 3), which has such flexibility as not to damage the wiring of the substrate and has such recoverability of compression deformation (elasticity) as to give excellent durability.

CITATION LIST

Patent Literature

Patent Literature 1: Japanese Patent Laid-Open No. 7-140472
Patent Literature 2: Japanese Patent Laid-Open No. 2003-043494
Patent Literature 3: Japanese Patent Laid-Open No. 8-225625

SUMMARY OF INVENTION

Technical Problem

Generally, a spacer having flexibility such as a resin particle and a polyorganosiloxane particle undergoes creep deformation when a constant load is continuously applied. Such a spacer undergoes stress relaxation when having continuously held at a fixed amount of displacement, as an opposing phenomenon. In other words, a predetermined time (stress relaxation time) is needed before the stress (load) and the strain (amount of displacement) are balanced.

When the spacer is creep-deformed, for example, in a process of assembling the liquid crystal display element, the need arises to consider the stress relaxation time. It takes time to bond the panels to each other, which accordingly causes a lowering of the productivity. Furthermore, the creep deformation of the spacer can also affect the alignment accuracy. In some cases, it may be necessary to readjust the load during panel bonding.

A conventional polyorganosiloxane particle has not been sufficient in terms of suppressing the occurrence of the creep deformation.

The residual displacement in Patent Literature 1 is the displacement that has been calculated by determining the amount of displacement which has remained in particles after a load is applied to the particles to cause 10% deformation and then has been immediately removed. The residual displacement thus obtained does not become a measure of the mechanical recoverability of time-dependent creep deformation.

In Patent Literature 2, a period of time during which the load is held is 30 seconds. It is difficult to accurately evaluate the compression resistance against the time-dependent creep deformation based on the amount $\Delta L$ of the movement of the indenter after the load has been held for 30 seconds and the particle diameter R of the particle.

Patent Literature 1 and Patent Literature 3 search for an allowable range for plastic deformation of the particle, but the occurrence of the creep deformation is not suppressed.

In particular, Patent Literature 3 discloses particles excellent in a recovery rate of the compression deformation, but Patent Literature 3 does not describe the polyorganosiloxane particle at all in which the occurrence of the creep deformation is suppressed.

When a particle which undergoes the creep deformation is used as the spacer, the stress relaxation time must be taken into consideration in processes such as alignment, and the productivity is lowered. In addition, the fluctuation of displacement with time for the constant load is not preferable as the spacer.

In the case of a particle in which the creep deformation does not occur, it is not necessary to consider the stress relaxation time, and also setting of conditions in panel design becomes easy. In the case of such a particle, the amount of displacement does not increase with time in such a state that the constant load is applied. For this reason, such a particle is useful as a spacer which is excellent in labor saving in a process, in the improvement of a design property, and in long-term reliability.

Then, an object of the present invention is to provide organic-inorganic composite particles of which the creep deformation is further suppressed; and a method for producing the same.

Solution to Problem

The organic-inorganic composite particles according to the present invention are organic-inorganic composite particles that comprise a compound having a siloxane bond and that have a particle diameter d0, wherein when a load is applied such that an amount of displacement Ds satisfies $0.08d0 \leq Ds \leq 0.15d0$ and is held for 180 seconds, conditions of the following Formulae (1) and (2) are satisfied.

$$(D180-Ds)/d0 \leq 1\% \quad \text{Formula (1)}$$

$$(Dmax-Ds)/d0 \leq 1\% \quad \text{Formula (2)}$$

(In the above Formulae d0 is an average particle diameter, D180 is an amount of displacement of a particle diameter after 180 seconds of application of the load, and Dmax is a maximum amount of displacement of the particle diameter during the 180 seconds.)

The method for producing organic-inorganic composite particles according to the present invention is a method for producing organic-inorganic composite particles that comprise a compound having a siloxane bond, the method comprising the steps of: stirring a raw material solution containing a silicon compound in which a non-hydrolyzable organic group and a hydrolyzable organic group are bonded to a silicon atom and containing a catalyst, to hydrolyze and condense the silicon compound to thereby form seed particles comprising a polyorganosiloxane having a Si—C bond; growing the seed particles to obtain grown particles, and then solidifying and drying the grown particles to thereby obtain dried solidified particles; and baking the dried solidified particles while maintaining the Si—C bond.

Advantageous Effects of Invention

According to the present invention, the organic-inorganic composite particles are particles in which the creep deformation is further suppressed because the amount of displacement with respect to the applied load is within the predetermined range. In the organic-inorganic composite particles of the present invention, the amount of displacement does not increase with time in such a state that the constant load is applied.

The production method of the present invention includes forming seed particles, growing the seed particles, and then baking the grown seed particles under a predetermined condition; and accordingly, the organic-inorganic composite particles can be obtained in which the creep deformation is further suppressed.

DESCRIPTION OF EMBODIMENTS

The embodiments of the present invention will be described below in detail with reference to the drawings.

1. Overall Structure

The organic-inorganic composite particles (hereinafter, also simply referred to as composite particles) of the present embodiment comprise a compound having a siloxane bond (Si—O—Si bond). In the composite particle of the present invention, the amount of displacement due to an applied load is within a specific range. Specifically, in the composite particle of the present embodiment, when a load is applied such that an amount of displacement Ds is $0.08d0 \leq Ds \leq 0.15d0$ and is held for 180 seconds, the conditions of the following Formulae (1) and (2) are satisfied. In the present specification, the particle diameter d0 means an average particle diameter which is determined by a Coulter counter method.

$$(D180-Ds)/d0 \leq 1\% \quad \text{Formula (1)}$$

$$(Dmax-Ds)/d0 \leq 1\% \quad \text{Formula (2)}$$

D180 is the amount of displacement of the particle diameter after 180 seconds of application of the load, Dmax is the maximum amount of displacement of the particle diameter during the 180 seconds, and d0 is the particle diameter of the composite particle before the load is applied. Thus, in the composite particle of the present embodiment, when a predetermined load is applied, both of a displacement rate ($(D180-Ds)/d0$) and the maximum displacement rate ($(Dmax-Ds)/d0$) after 180 seconds are 1% or smaller. The amount of displacement is determined in such a state that the predetermined load is applied and the load is kept applied for 180 seconds, and accordingly the amount of displacement after 180 seconds is an end amount of displacement, and the displacement rate after 180 seconds is an end displacement rate.

The relationship between the elapsed time and the amount of displacement when the load is applied to the composite particle of the present invention will be described with reference to FIGS. 1 and 2.

Figure 1:
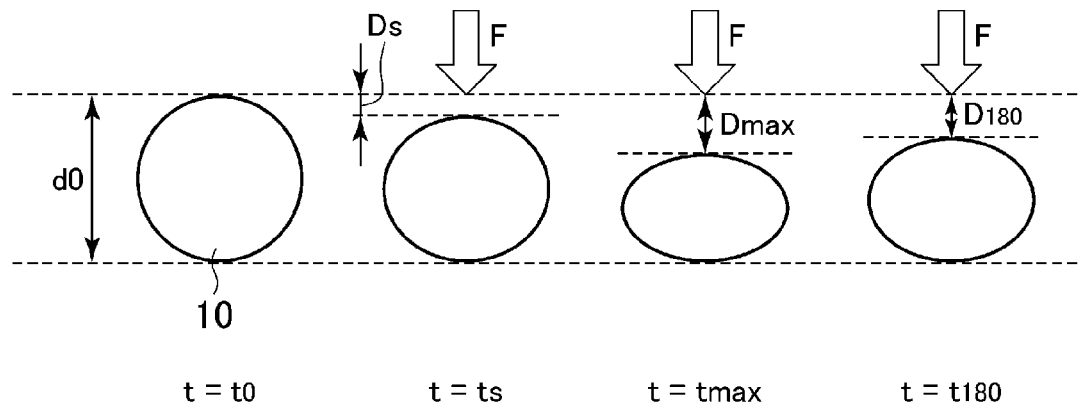
FIG. 1 is a schematic diagram for describing the amount of displacement of the organic-inorganic composite particle of the present embodiment.

As is shown in FIG. 1, the composite particle 10 has a particle diameter d0 in a state in which the load is not applied (time t0). A predetermined load F which gives a start amount of displacement Ds ($0.08d0 \leq Ds \leq 0.15d0$) is applied to the composite particle 10 at the time ts, and is held for 180 seconds. In the present embodiment, the composite particle 10 is placed on a flat pressing plate, and a load F is applied such that 10% of the particle diameter d0 is deformed with the use of a circular flat plate indenter which is made of diamond and has a diameter of 50 μm.

Figure 2:
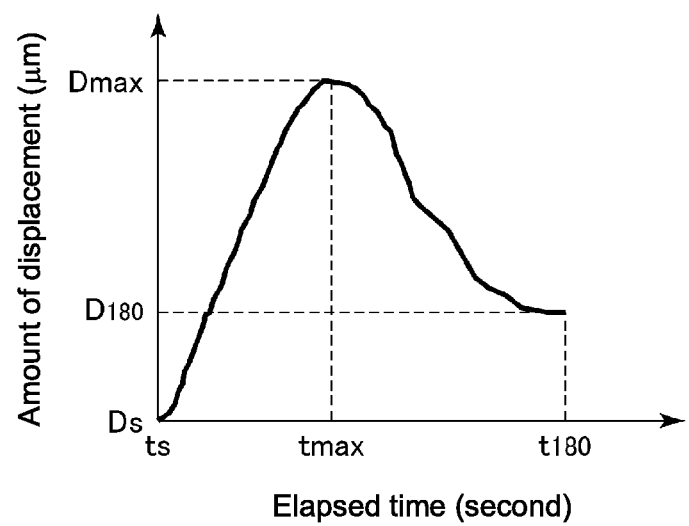
FIG. 2 is a graph showing a relationship between an elapsed time and the amount of displacement when a load is applied to the organic-inorganic composite particle of the present embodiment.

The amount of displacement of the composite particle 10 gradually increases when the load F is applied as is shown in FIG. 2, and shows the maximum amount of displacement Dmax at the time tmax. After that, the amount of displacement of the composite particle 10 decreases. At the t180 after 180 seconds from the ts, the end amount of displacement of the particle diameter of the composite particle 10 is D180 (<Dmax).

As is shown in the above Formula (1), in the composite particle 10 of the present embodiment, an end displacement rate ((D180−D0)/d0) is 1% or smaller. In the composite particle 10 of the present embodiment, the maximum displacement rate ((Dmax0−D0)/d0) during the 180 seconds is also 1%, as shown in the above Formula (2). The smaller the maximum displacement rate and the end displacement rate are, the smaller the creep deformation of the composite particle is, and the more excellent the long-term reliability (durability) thereof is. It is preferable that the end displacement rate be 0.5% or smaller. It is preferable for the maximum displacement rate to be 0.5% or smaller, and is more preferable to be 0.

It is preferable that the composite particle of the present invention have a 10% compressive elastic modulus of 2 GPa or larger and 20 GPa or smaller. A particle having a too small 10% compressive elastic modulus is too soft, and is largely displaced by the load. For this reason, the particle having a too small 10% compressive elastic modulus cannot sufficiently exhibit a function necessary for the spacer. On the other hand, a particle having a too large 10% compressive elastic modulus is too hard as the spacer. The particle having a too large 10% compressive elastic modulus causes a breakage or the like of peripheral members with which the particle comes in contact.

When the 10% compressive elastic modulus of the composite particle that comprises a compound having a siloxane bond is 2 GPa or larger, an appropriate distance between substrates can be held even when the load has changed, and accordingly the composite particle having a 10% compressive elastic modulus of 2 GPa or larger can be used as the spacer. When the 10% compressive elastic modulus is 20 GPa or smaller, the elastic property of the composite particle becomes more preferable.

In the composite particles of the present invention, it is preferable that an average particle diameter which has been determined by the Coulter Counter method be 0.5 to 200 μm. The composite particles of which the average particle diameter is in this range can be suitably used as a spacer, in an electronic member or the like. It is more preferable that the average particle diameter of the composite particles of the present invention be 1 to 100 μm. In particular, when the composite particles are used for the application of the liquid crystal panel, the average particle diameter of the composite particles is preferably 1 to 15 μm, is more preferably 2 to 12 μm, and is most preferably 3 to 7 μm.

In addition, it is preferable that a CV value which is a coefficient of variation of the particle size distribution of the composite particles in the present invention be 5% or smaller. The CV value is determined by a standard deviation of the particle diameters and the average particle diameter, as is shown by the following Formula (A1). A method for calculating the CV value will be described later.

CV value (%)=(standard deviation of particle diameters/average particle diameter)×100    Formula (A1)

The composite particles of which the CV value is 5% or smaller can be suitably used as a spacer, because the dispersion of the particle diameters is small. It is more preferable that the CV value of the composite particles be 2.5% or smaller. In addition, it is preferable that the composite particles of the present embodiment be monodispersed particles each having a true sphere shape.

A range of suitable average particle diameters of the composite particles depends on the application. The suitable average particle diameter is, for example, 6 to 16 μm for the application of organic EL, 7 to 25 μm for the application of PDLC, 25 to 50 μm for the application of a 3D shutter, and 40 to 120 μm for the application for LED illumination.

2. Production Method

Next, a method for producing the organic-inorganic composite particles of the present invention will be described.

The production method of the present invention includes a seed particle forming step, a particle growing step, and a baking step. Each step will be described below.

<Seed Particle Forming Step>

In the seed particle forming step, a silicon compound of a raw material is hydrolyzed and condensed in an aqueous solvent together with a catalyst to form droplet-like seed particles. Thereby, a seed particle liquid is obtained in which the seed particles are dispersed in the aqueous solvent. The silicon compound to be used as the raw material is an alkoxide in which a non-hydrolyzable organic group and a hydrolyzable organic group are bonded to a silicon atom, and is represented by the following General formula (PS1).

$$R^1{}_n Si(OR^2)_{4-n} \qquad \text{General formula (PS1)}$$

In the above General formula (PS1), $R^1$ is a non-hydrolyzable organic group selected from an alkyl group having 1 to 20 carbon atoms, an alkenyl group having 2 to 20 carbon atoms, an aryl group having 6 to 20 carbon atoms, and an aralkyl group having 7 to 20 carbon atoms. At least one hydrogen atom in the alkyl group may be replaced by a methacryloyloxy group, an acryloyloxy group or an epoxy group. $R^2$ is an alkyl group having 1 to 6 carbon atoms, and n is an integer of 1 to 3. When n is 2 or larger, a plurality of $R^1$ may be the same with or different from each other. When n is 2 or smaller, a plurality of hydrolyzable organic groups $OR^2$ may be the same with or different from each other.

It is preferable that the silicon compound represented by the above General formula (PS1) be trialkoxysilane (n=1). It is preferable for the trialkoxysilane to account for 60% or more (in terms of mole) of the whole raw material, and is more preferable to account for 80% or more (in terms of mole). Examples of preferred trialkoxysilanes include: methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, vinyltrimethoxysilane, vinyltriethoxysilane, γ-glycidoxypropyltrimethoxysilane, γ-acryloyloxypropyltrimethoxysilane, and γ-methacryloyloxypropyltrimethoxysilane.

Among them, the methyltrimethoxysilane and the vinyltrimethoxysilane are preferable because they are excellent in the reactivity of a hydrolytic condensation reaction. The silicon compounds can be used alone or in combination of two or more types.

Components which may be combined include a compound represented by the following General formula (PS2).

$$R^3{}_m Si(OR^4)_{4-m} \qquad \text{General formula (PS2)}$$

In the above General formula (PS2), $R^3$ is a non-hydrolyzable organic group selected from an alkyl group having 1 to 20 carbon atoms, an alkenyl group having 2 to 20 carbon atoms, an aryl group having 6 to 20 carbon atoms, and an aralkyl group having 7 to 20 carbon atoms. At least one hydrogen atom in the alkyl group may be replaced by a methacryloyloxy group, an acryloyloxy group or an epoxy group. $R^4$ is an alkyl group having 1 to 6 carbon atoms, and m is an integer of 0 to 3. When m is 2 or larger, a plurality of $R^3$ may be the same with or different from each other. When m is 2 or smaller, the plurality of hydrolyzable organic groups $OR^4$ may be the same with or different from each other.

In the above General formula (PS2), examples of the silicon compounds (tetraalkoxysilanes) with m=0 include tetramethoxysilane, tetraethoxysilane, tetrapropoxysilane and tetrabutoxysilane.

In the above General formula (PS2), examples of the silicon compounds with m=2 (dialkoxysilanes) include dimethyldimethoxysilane, dimethyldiethoxysilane, and diphenyldimethoxysilane.

In the above General formula (PS2), examples of the silicon compounds with m=3 (monoalkoxysilanes) include trimethylmethoxysilane, trimethylethoxysilane, triisobutylmethoxysilane, diisobutylmethylmethoxysilane, and triethylmethoxysilane.

In the above General formula (PS2), in the case of m=1, a trialkoxysilane is used in which the non-hydrolyzable organic group $R^3$ and the hydrolyzable organic group $OR^4$ are different from the non-hydrolyzable organic group $R^1$ and the hydrolyzable organic group $OR^2$ in the above General formula (PS1).

The silicon compound is dissolved in the aqueous solvent together with the catalyst, and thereby a raw material solution is prepared. It is preferable that a concentration of the silicon compound in the raw material solution be 20% by mass or lower. When the concentration of the silicon compound is in a range of 5 to 15% by mass, the concentration is advantageous in terms of the particle diameter of the seed particles to be produced and a volumetric efficiency, for example.

As the aqueous solvent, a mixed solvent of water and a water-miscible organic solvent, or water can be used. Examples of the water-miscible organic solvents include: lower alcohols such as methanol, ethanol, propanol and butanol; ketones such as acetone, dimethyl ketone and methyl ethyl ketone; and ethers such as diethyl ether and dipropyl ether. The water-miscible organic solvent can be used singly as a mixture with water. Two or more water-miscible organic solvents may be combined and used as a mixture with water.

As a catalyst, a basic catalyst is preferable, and ammonia or an amine can be used. The amine can be selected, for example, from monomethylamine, dimethylamine, monoethylamine, diethylamine and ethylenediamine. The catalysts may be used alone or in combination of two or more types. Among the catalysts, ammonia is preferable from the viewpoints of being low in toxicity, being easily removable from particles, and being inexpensive.

The raw material solution may contain a stabilizer. The stabilizer enhances a solubility of the silicon compound, and stabilizes produced seed particles. Examples of the stabilizers include a surfactant and a polymer dispersing agent.

The silicon compound represented by the above General formula (PS1) has a hydrolyzable organic group ($OR^2$) which is bonded to a silicon atom, and accordingly hydrolysis and condensation occur by stirring of the raw material solution under predetermined conditions. The raw material solution can be stirred with the use of a well-known stirrer. A pH at the start of the reaction is appropriately set according to the type of the silicon compound of the raw material. For example, in the case of the methyltrimethoxysilane, the pH at the start of the reaction is preferably 9.7 to 11.7, and is more preferably 9.7 to 11.2. A reaction temperature is appropriately set according to the type of the silicon compound, but is preferably in a range of 0 to 50° C., for example.

By the hydrolytic condensation of the silicon compound, the seed particles that comprise a polyorganosiloxane having a Si—C bond are produced. The polyorganosiloxane is soluble, for example, in alcohol, but insoluble, for example, in a mixed liquid of water and alcohol. Because of this, the seed particle liquid is obtained in which the droplet-like seed particles are dispersed in the aqueous solvent.

The droplet-like seed particle is different in properties from a conventionally known solid seed particle. The droplet-like seed particle is not a particle which has been subjected to a cleaning step or a drying step, but basically, the presence is confirmed only in a liquid in which the seed particles are formed. The droplet state can be determined, for example, by adding a large amount of alcohol to the seed particle liquid and observing the dissolution of the particles. Alternatively, the droplet state can be also determined by pressing a cover glass on a slide glass with a finger before observation by an optical microscope, and then observing the crushed state of the particle with the optical microscope.

The precision of the particle diameters of the seed particles can be evaluated, for example, by the CV value. As has been described above, the CV value of the particles is determined by the standard deviation of the particle diameters and the average particle diameter. The average particle diameter of the seed particles is, for example, in a range of 1 to 50 μm. The CV value of the seed particles is preferably 10% or smaller, and is more preferably 5% or smaller.

In general, if a hydrophilic substance is mixed with a hydrophobic substance, a phenomenon of phase separation occurs. Alternatively, it is known that a substance having a hydrophilic group and a hydrophobic group in one molecule represented by a surfactant or the like forms a micelle in which functional groups having the same property face each other. Such an associated body as to be formed due to a difference in the easiness of mixing with water is flexible because of having no bond in the associated body, and shows elastic properties.

On the other hand, the hydrolysate of the silicon compound represented by the General formula (PS1) has a hydrophobic organic group portion (non-hydrolyzable organic group $R^1$) and a hydrophilic silanol group which is obtained from the hydrolyzable organic group $OR^2$. The organic group portion can form an associated body, and become a large elastic body portion which can be deformed according to the load. When the silicon compound represented by the above General formula (PS1) has been subjected to the reaction in an environment in which a quantity of a catalyst is relatively large, it is promoted that an intermolecular Si—O—Si bond is formed by the dehydration condensation of the silanol group. Because the degree of freedom in the associated body formation is lost, a large associated body cannot be obtained.

In order to obtain an associated body based on a large organic group portion which shows elastic properties, it is necessary to appropriately suppress the formation of the Si—O—Si bond. In addition, by the associated body based on the large organic group portion being formed, the formation of a dense Si—O skeleton is hindered, which can accordingly suppress an increase in crosslink density. The associated body and the Si—O—Si bond form a pseudo-elastomer structure as a soft segment and a hard segment, respectively, and it is considered that as a result, an organic-inorganic composite particle having appropriate hardness has been obtained, in which creep deformation is further suppressed.

The dense Si—O skeleton in the seed particle is formed when the growth of the seed particles is completed. If the seed particles are on the way of growth, the dense Si—O skeleton is not formed. A period of time for the seed particles to complete the growth is uniquely determined by synthesis conditions. The period of time for the seed particles to complete the growth can be grasped by previously synthesizing particles under the same conditions using the same raw material solution, and observing changes of a state of the raw material solution and the particle diameter. The period of time for the seed particles to complete the growth is a period of time necessary for the seed particles to stop the growth after the raw material solution has become cloudy. This period of time is defined as the growth stopping time.

In the present embodiment, it is preferable to limit the synthesis time in the seed particle forming step to 40 to 80% of the growth stopping time. When the synthesis time for the seed particles is too long, a dense Si—O skeleton is formed. On the other hand, when the synthesis time for the seed particles is too short, it becomes difficult to obtain monodispersed seed particles. When the seed particles are synthesized for a period of time of 40 to 80% of the growth stopping time, the seed particles can be formed in which the Si—O skeletons are relatively sparse. The seed particles can be subjected to the particle growing step before the growth of the seed particles is completed, and accordingly, it is also less likely to occur that the formation of the associated body from the organic group portion in the grown particle is hindered.

In order to obtain a particle which can be deformed according to the load, it is required to keep the quantity of the catalyst low. In principle, it is desirable to reduce the quantity of the catalyst also when the seed particles are synthesized. However, when the quantity of the catalyst is small at the time of synthesis of the seed particles, it may take a long time for the particle to grow, and in the worst case, a nucleus may not be formed. In addition, the variation of the particle diameters of the obtained particles is large, and the precision of the particle diameters represented by the CV value also tends to become high.

In order to obtain seed particles having appropriate particle diameters and an appropriate CV value, a catalyst concentration in the seed particle forming step, for example, at the time when the methyltrimethoxysilane is used alone, is preferably 0.001 mol/L or higher, and is more preferably approximately 0.005 to 0.020 mol/L.

<Particle Growing Step>

In the particle growing step, seed particles are grown to provide grown particles, and then the grown particles are solidified to provide solidified particles. Firstly, a silicon compound represented by the above General formula (PS1) is dissolved in an aqueous solvent, and a solution for growing particles is prepared. As has been already described, the methyltrimethoxysilane or vinyltrimethoxysilane are preferable as the silicon compound. For example, a silicon compound of the same type as that used in the formation of the seed particles can be used, but a different type of silicon compound may be used.

As the aqueous solvent, a water-miscible organic solvent as described above, or water can be used. As has been described above, the water-miscible organic solvent can be singly mixed with water. Two or more water-miscible organic solvent may be combined and mixed with water. The solution for growing particles can be prepared with the use of a well-known stirrer.

The solution for growing particles may contain a stabilizer. The stabilizer has a function of enhancing the solubility of the silicon compound. The stabilizer is not limited in particular, but includes a surfactant, such as an anionic surfactant. As the anionic surfactant, an alkyl sulfate is preferable which has an alkyl group having 6 to 30 carbon atoms.

The alkyl sulfate can be selected, for example, from a potassium salt, a sodium salt and an ammonium salt, and dodecyl sodium sulfate and dodecyl ammonium sulfate are preferable. When the solution for growing particles is mixed with the seed particle liquid, the stabilizer also functions as a surface protecting agent for seed particles in which the Si—O skeletons are sparsely formed.

The silicon compound is absorbed by the seed particles by the solution thus prepared for growing particles being mixed with the seed particle liquid and the mixture being stirred. Thereby, the seed particle grows and becomes a grown particle, and a grown particle liquid is obtained.

In the particle growing step, it is preferable to carry out the synthesis in a state in which the catalyst concentration is low, in order to make the Si—O skeletons sparse. Because the seed particle liquid containing the catalyst and the solution for growing the particles are mixed, the catalyst concentration in the liquid becomes low. For example, in the case of the methyltrimethoxysilane, it is desirable to add the seed particle liquid to the solution for growing the particles such that the catalyst concentration in the whole solution becomes 0.005 mol/L or lower. The final catalyst concentration in the particle growing step is preferably 0.005 mol/L or lower.

When the particle diameter of the target grown particle is large, the particle growing step may be repeated for multiple times. When the particle growing step is repeated, the concentration of the catalyst in the solution is occasionally lowered. When the quantity of the catalyst is too small, it becomes difficult to obtain grown particles having a target size, and accordingly it is desirable to keep an appropriate catalyst concentration which is 0.005 mol/L or lower, by appropriately adding the catalyst as needed.

When the grown particle has reached the target particle diameter, the catalyst is newly added to the grown particle liquid to hydrolyze and condense the silicon compound contained in the grown particles. The catalysts include basic catalysts as described in the formation of the seed particles. By the hydrolytic condensation of the silicon compound being progressed, the grown particle is aged and is solidified, and a solidified particle is obtained. The solidified particle comprises a polyorganosiloxane having an Si—C bond.

After the solidified particles have been separated from the aqueous solvent, fine particles and the like contained in the solidified particles are appropriately removed by cleaning. By drying the solidified particle after the cleaning, a composite particle can be obtained in which Si—O skeletons are sparse and which has an associated body based on the organic group portion.

<Baking Step>

The solidified particle after the drying is baked under conditions under which the Si—C bond is kept. By the Si—C bond being kept, the associated body based on the organic group portion remains in the obtained composite particle. By being baked under appropriate conditions, a composite particle can be obtained which is provided with a compressive strength corresponding to the application. The baking is preferably carried out at 200° C. to 1000° C. under an inert atmosphere of nitrogen or the like, or in vacuum. By being baked under such conditions, the composite particle can be obtained which has an appropriate compressive strength and hardness as a spacer. The baking temperature is more preferably 400 to 800° C.

The baking temperature is selected according to the type of organic group which is contained in the particle. In the case of a particle having an organic group which is apt to be thermally decomposed, it is desirable to treat the particle at a relatively low temperature within the above baking temperature range. On the other hand, in the case of a particle having an organic group which is less likely to be thermally decomposed, it is preferable to treat the particle at a higher temperature within the range of the above baking temperature.

For example, in the case of the particle derived from the methyltrimethoxysilane, an appropriate baking temperature is 600 to 730° C., and in the case of the particle derived from the vinyltrimethoxysilane, an appropriate baking temperature is 250 to 350° C. In any case, appropriate conditions may be selected according to a breaking strength and an elastic modulus which are required for the target particle. The baking apparatus is not limited in particular, and an electric furnace, a rotary kiln or the like can be used. In the case where the rotary kiln is used, the rotary kiln is advantageous because of being capable of baking the particles while stirring the particles.

The baking can be also performed under the coexistence with oxygen (for example, in the air). By the baking under the coexistence with oxygen, the oxidative decomposition of organic components and the generation of combustion heat are promoted. Because of this, when oxygen exists, the particles are baked at a lower temperature than that at the time when being baked under an inert atmosphere or in vacuum. A preferable temperature range is a range between a temperature equal to or higher than a temperature lower than the decomposition temperature of the organic group contained in the solidified particle by 100° C., and a temperature lower than the decomposition temperature of the organic group.

When the temperature is raised immediately to a temperature equal to or higher than the decomposition temperature of the organic group and the particles are baked, the organic group is rapidly decomposed and desorbed, and the breaking strength of the obtained particle is lowered. In some cases, the particle cannot withstand the rapid contraction and is cracked. Furthermore, the organic group is excessively lost, and a particle having a required flexibility cannot be obtained. Such problems can be avoided by baking the particle at an appropriate temperature corresponding to the type of organic group.

Specifically, it is preferable for the particle obtained from the methyltrimethoxysilane to be subjected to baking treatment at a temperature in a range of 250 to 350° C. When the decomposed or desorbed organic component burns on the spot, the heat is occasionally transferred excessively. For example, by reducing the oxygen concentration to 10% by volume or lower, it is possible to avoid the decomposed or desorbed organic component from burning on the spot. It is one effective measure to immediately remove the organic component which has been decomposed or desorbed, to the outside of the system by blowing air or the like.

An amount of the decomposed organic group can be grasped, for example, by comparing the peaks of the organic group before and after baking, by infrared spectroscopy (IR). As for a proportion of the amount of the decomposed organic group, an optimum proportion can be selected according to a required breaking strength and elastic modulus. A rate of a residual organic group is preferably 20% or larger, and is more preferably in a range of 30 to 90%.

3. Action and Effect

The composite particle produced as described above comprises a polysiloxane having a Si—C bond, and the amount of displacement relative to the applied load is within a specific range. Specifically, in the composite particle of the present embodiment, when a load is applied such that an amount of displacement $Ds$ is $0.08d0 \leq Ds \leq 0.15d0$ and is held for 180 seconds, both of the end displacement rate $((D180-Ds)/d0)$ and the maximum displacement rate $((Dmax-Ds)/d0)$ are 1% or smaller, and accordingly the particle can be deformed according to the load.

Moreover, in the composite particles of the present embodiment, the amount of displacement does not increase with time in a state in which a constant load is applied. The composite particle of the present embodiment is a particle in which the creep deformation is further suppressed.

The composite particle of the present embodiment is produced by forming the seed particle in a limited synthesis time, growing the seed particle, and then baking the particle under predetermined conditions; and accordingly has characteristics as described above.

Generally, in the synthesis of polyorganosiloxane particles, it is known that dense particles grow when the concentration of catalyst (ammonia) is high, and particles grow in a sparse state when the concentration of catalyst is low. When the seed particles are synthesized, the quantity of the catalyst is relatively large, and dense Si—O skeletons are formed in the seed particle. Because of this, the density of the Si—O skeleton in the seed particle becomes different from the density of the Si—O skeleton in the grown portion.

The thus produced difference in the densities of the Si—O skeleton is not completely eliminated even after the production step, and remains even in the produced composite particle. It is known that the difference in the densities of the Si—O skeleton causes a difference in refractive indices in the composite particle. The boundary of the density of the Si—O skeleton is checked as an interface of a core-shell structure which has the seed particle as a core and a grown portion as a shell.

In the production method of the present embodiment, the synthesis time for the seed particles is set short, and is set at 40 to 80% of the growth stopping time; and accordingly, the growth of the seed particle is not completed. Such a seed particle is grown, and accordingly a composite particle can be produced in which the core-shell structure does not exist. It can be checked by general optical observation that the core-shell structure does not exist in the composite particle.

The absence of the core-shell structure in the composite particle becomes an evidence that the formation of the dense Si—O skeleton in the seed particle has been suppressed. As has been described above, the difference in the densities of the Si—O skeleton exists in the composite particle as the difference of the refractive indices in the interface. When the difference of the refractive indices in the interface is not checked in the composite particle, the difference in the densities of the Si—O skeleton does not exist in the composite particle. In other words, the skeleton in the composite particles is uniform.

In the composite particle which does not have the core-shell structure, the organic group portion in the particle uniformly exists in such a state that a degree of freedom is high, which originates in such a result that the formation of the dense Si—O skeleton in the seed particle has been suppressed. In the composite particle, an associated body based on a larger organic group portion is formed, and elastic properties increase. As a result, the composite particle has been obtained in which the creep deformation is further suppressed.

When the composite particle of the present embodiment has been used as a gap material for a liquid crystal panel or the like, effects can be obtained such as the labor saving in a bonding step and the improvement of the design property. Because the composite particle of the present embodiment does not cause the creep deformation, there is no risk of losing a display performance even when a load is applied to the liquid crystal panel for a long period of time.

When the composite particles of the present embodiment and the adhesive resin are mixed and used as an adhesive for holding a gap, the influence of the creep deformation of the adhesive resin itself can be reduced. In this case, it can be expected that the adhesive for holding the gap can be highly reliable even during long-term use.

The composite particle of the present embodiment, when a load is applied thereto, immediately changes to an amount of displacement according to the load, and accordingly the detection speed is very large. Moreover, the composite particle of the present embodiment can keep the precision for a long period of time. Because of having such characteristics, the composite particle of the present embodiment can also be suitably used as a gap holding material such as a highly sensitive pressure sensor.

In the production method of the present embodiment, the seed particle is formed by the silicon compound which is the raw material being stirred in the aqueous solvent together with the catalyst, and accordingly the particle diameter of the seed particle grows in a state of being swollen by the raw material which has soaked into the particle. The particle during synthesis is not in a form of a solid but in a form of a droplet. For example, when an alcohol is added to the particle during synthesis, an interface of the particle disappears, and it is confirmed that the particle liquates out. From such a phenomenon, it can be confirmed that the particle during the synthesis is in the form of the droplet.

In the droplet-like seed particle, the organic group portion exists in such a state that a degree of freedom is high, and accordingly a larger associated body is formed. Thereby, the elastic properties of the obtained composite particle increase, and accordingly the creep deformation is suppressed. Furthermore, the existence of the organic group portion of which the degree of freedom is high disturbs the formation of the Si—O skeleton, which accordingly can suppress the plastic deformation originating in the Si—O skeleton. As a result, a particle excellent in elastic properties is obtained.

In addition, in a conventional and general method of synthesizing polyorganosiloxane particles, the quantity of the catalyst is relatively large, and the raw material is gradually supplied. Such a method is referred to as a two-layer method or a homogenization method, and particles grow while forming the Si—O skeleton. In the conventional production method, an existing range of the organic group portion is limited, and accordingly a large elastic body portion is not formed.

In the conventional production method, the obtained particle has the elastic modulus lowered, but has not been sufficient in terms of the elastic properties and the suppression of the creep deformation. In addition, in the conventional two-layer method, there is such limitation in the silicon compound of the raw material that the specific gravity thereof must be lower than that of the solvent, and only a specific silicon compound has been capable of being used.

In the production method of the present embodiment, the reaction time can be remarkably shortened and the productivity is improved, as compared with the conventional method such as the two-layer method. The particle is grown in a short time, which is also one of the causes that the Si—O skeletons are sparsely formed and the associated body based on the large organic group portion is obtained. Moreover, in the production method of the present embodiment, such points are also advantageous points that the silicon compound of the raw material is not limited, and that the silicon compound which can be employed as the raw material can be selected from a wide range.

4. Modified Example

The present invention is not limited to the above embodiment, and can be appropriately modified within a range of the scope of the present invention.

In the above embodiment, the amount of displacement of the composite particle 10 at the time when the load F is applied (start amount of displacement Ds, maximum amount of displacement Dmax, and end amount of displacement D180) has a relation of Dmax>D180>Ds, but the magnitude relation of the amount of displacement is not limited to them. The start amount of displacement Ds, the maximum amount of displacement Dmax, and the end amount of displacement D180 can have any magnitude relation in which the Dmax is the maximum. The start amount of displacement Ds or the end amount of displacement D180 may be equal to the maximum amount of displacement Dmax.

In addition, in the above embodiment, the amount of displacement was evaluated by a load by which 10% of the particle diameter of the composite particle 10 is deformed being held for 180 seconds, but the load F to be applied is not limited to them. Similar results can be obtained if a load F by which 8 to 15% of the particle diameter d0 of the composite particle 10 is deformed has been kept for 180 seconds.

The diameter of a circular flat indenter for applying the load F to the composite particles 10 can be appropriately selected according to the particle diameter d0 of the composite particles 10 to be measured. The diameter of the circular flat indenter can be changed to, for example, 200 μm or 500 μm.

The following functional particle can also be obtained by providing a functional layer by using the composite particle of the embodiment as a mother particle and subjecting the surface to coating treatment. Examples of the functional particles include an electro-conductive particle and an anchoring particle.

The electro-conductive particle can be produced by having an electro-conductive layer of the functional layer provided on the surface of the composite particle of the mother particle. The electro-conductive particles can be used, for example, as gap holding particles having electro-conductivity between upper and lower substrates in a liquid crystal display element and a semiconductor element, or for an anisotropic electro-conductive material containing the gap holding particles.

Such electro-conductive particles can maintain stable electrical connectivity because the gap does not vary even in an environment in which a load is applied for a medium to long period of time. The electro-conductive particles containing the composite particles of the present embodiment become a spacer excellent in long-term reliability.

The electro-conductive layer can be formed by using any material capable of providing conduction. Examples of the materials which can be used include a metal, a metal salt and an electro-conductive resin. Preferred materials are gold, silver, or an alloy (such as solder). The thickness of the electro-conductive layer is not limited in particular, but when the electro-conductive layer has a thickness of 50 nm or larger, the electro-conductive layer can exhibit stable electro-conductivity. The adhesiveness between the composite particle and the electro-conductive layer can be enhanced by subjecting the surface to pretreatment by forming metal nuclei on the surface of the composite particle, or subjecting the surface to surface treatment by a silane coupling agent or the like.

The electro-conductive particle can secure electrical connection if the electrical resistance value is 30Ω or smaller.

The anchoring particle can be produced by having an anchoring layer comprising a thermoplastic resin provided on the surface of the composite particle of the mother particle. When the anchoring particles are used as an in-plane spacer for the liquid crystal display element, the anchoring particles anchor to the substrate when the anchoring layer is heated and melts. The spacer formed from the anchoring particles anchors to the substrate even when the liquid crystal flows at the time of liquid crystal injection, and accordingly the movement is suppressed.

Any material containing a thermoplastic component can be used when the anchoring layer is formed. It is preferable that a glass transition temperature of the thermoplastic component be 150° C. or lower. Examples of the thermoplastic components include a styrene resin and an acrylic resin. The thickness of the anchoring layer is not limited in particular, but is preferably approximately 0.05% to 10% of the diameter of the composite particle. When the thickness of the anchoring layer is within this range, a sufficient fixing strength can be obtained without adversely affecting the gap width.

The adhesiveness between the composite particle and the resin layer can be enhanced by subjecting the surface of the composite particle to surface treatment by a silane coupling agent or the like before the anchoring layer is provided.

The anchoring particle can be fixed onto the substrate by being heated under predetermined conditions. Heating within 150° C. or lower for one hour does not cause a problem in the productivity.

It is preferable that an anchoring ratio of the anchoring particle be 50% or larger in a blow-off test. The anchoring particle of which the anchoring ratio is 50% or larger can withstand the flow of a liquid crystal at the time of the liquid crystal injection. The anchoring particles are not passed to the edge portion of the panel, and accordingly the in-plane gap can be stably kept.

5. Evaluation Method

In Examples which will be described later, each physical property value of the organic-inorganic composite particles is evaluated by the following methods.

<Particle Diameter, CV Value>

The average particle diameter d0 of the composite particles and the standard deviation of the particle diameter are determined with the use of Coulter Counter (Multisizer IVe, manufactured by Beckman Coulter, Inc.). The CV value which is a coefficient of variation of the particle size distribution can be calculated by the following Formula (A1).

$$CV \text{ value (\%)} = (\text{standard deviation of particle diameters}/\text{average particle diameter}) \times 100 \quad \text{Formula (A1)}$$

<End Displacement Rate, Maximum Displacement Rate>

As has been shown in FIG. 1, the composite particle 10 is kept under a predetermined load F for 180 seconds. The composite particle 10 is placed on a flat pressing plate, and a load F is applied such that 8 to 15% of the average particle diameter d0 of the composite particle 10 is deformed with the use of a circular flat indenter which is made of diamond and has a diameter of 50 μm.

The amount of displacement (Ds) when the load has reached the predetermined load F and the amount of displacement (D180) after holding for 180 seconds are determined. The maximum amount of displacement (Dmax) during the 180 seconds is also recorded. The end displacement rate ((D180−D0)/d0) and the maximum displacement rate ((Dmax−D0)/d0) are calculated with the use of the particle diameter d0, the amount of displacement D180 and the amount of displacement Dmax of the composite particle.

<10% Compressive Elastic Modulus>

The 10% compressive elastic modulus of the composite particle can be determined based on a compression behavior. The compression behavior is observed by applying a load to the composite particle using a micro-compression tester (MCTM-200, manufactured by Shimadzu Corporation). The 10% compressive elastic modulus can be calculated by the following method.

Composite particles of a sample are dispersed on a flat work plate (material: SKS flat plate), and a load is applied to one sample of radius r(=d0/2) at a fixed speed, and the particle is deformed until the amount of compressive displacement becomes 10% of the particle diameter d0. A circular flat indenter which is made of diamond and has a diameter of 50 μm is used for applying the load. The load F when the particle has been deformed by 10% and the amount of compressive displacement Dx are determined, and the 10% compressive elastic modulus E is calculated by using the following Formula (A2). Here, K is the Poisson's ratio of the particle (constant of 0.38).

[Mathematical 1]

$$E = \frac{3 \times F \times (1 - K^2)}{2^{1/2} \times Dx^{3/2} \times r^{1/2}} \quad \text{Formula (A2)}$$

<Electrical Resistance Value>

The electrical connectivity of the electro-conductive particle is evaluated by measuring the electrical resistance value. Specifically, the electrical resistance values are measured on 20 pieces of composite particles, respectively, with the use of a micro-compression tester (manufactured by Shimadzu Corporation), and the average value of the measured values of 20 pieces is defined as the electrical resistance value.

<Anchoring Ratio>

The anchoring performance of the anchoring particles is evaluated by a blow-off test. In order to carry out the blow-off test, firstly, the anchoring particles are spread on a slide glass, and are heated at 120° C. for 30 minutes. The number of particles on the slide glass is defined as the number N0 before the blow-off test.

After that, the slide glass is cooled to room temperature, and nitrogen gas is blown for 30 seconds under predetermined conditions. The conditions for spraying shall be the followings: a nozzle pressure is 0.01 MPa, a distance between a nozzle and a slide glass is 10 mm, and a spraying angle is 450. The number of particles existing on the slide glass after the blow-off test is defined as N1, and the anchoring ratio bp is calculated according to the following Formula (A3).

$$bp=(N1/N0) \times 100 \qquad \text{Formula (A3)}$$

6. EXAMPLES

Examples of the present invention are described as follows.

Example 1

(Seed Particle Forming Step)

In a 1-L plastic container, 360 g of methyl trimethoxysilane (hereinafter abbreviated as MTMS) and 48 g of deionized water as raw material were accommodated and stirred at about 200 rpm. After 3 hours, a homogeneous solution was obtained.

In a 2-L glass container, 1800 g of water and 18 g of 1 normal ammonia aqueous solution were accommodated, and the homogeneous solution was added thereto to prepare a raw material solution. Using the raw material solution, the seed particles were grown to determine the growth stopping time. The raw material solution became cloudy within a few tens of seconds after addition of the homogeneous solution, with particle nuclei having occurred in the liquid. The growth of particle diameter of the seed particles stopped after 20 minutes from emergence of the cloudiness in the raw material solution. The growth stopping time is 20 minutes.

The synthesis time of particles in the seed particle forming step in Example 1 was set to 50% of the growth stopping time, or, in other words, set to 10 minutes.

Using the same raw material solution described above, synthesis was performed for 10 minutes to form seed particles, so that a seed particle liquid was obtained. The particle diameter of the seed particles determined from an optical microscope image was about 6.3 μm.

(Particle Growing Step)

In a 20-L reaction vessel, 14962 g of water, 3000 g of MTMS, and 38 g of 1% ammonium dodecyl sulfate aqueous solution were stirred to prepare a solution for growing particles. To the solution for growing particles, 1500 g of the seed particle liquid was added and stirred at about 80 rpm, while confirming the particle diameter with an optical microscope as needed. Thereby the seed particles grew, so that grown particles were obtained. In the particle growing step, the concentration of ammonia reached 0.0006 mol/L.

After a lapse of about 2 hours, the growth of particle diameter stopped. At this time, 200 g of 25 mass % aqueous ammonia was added so that the particles were aged. The particles were solidified to obtain solidified particles. Solid-liquid separation was then performed by decantation and washing was performed three times by using methanol. Subsequently, natural drying was performed for 2 days and drying by heating at 110° C. was further performed. The dried solidified particles had an average particle diameter of 16.34 μm and a CV value of 1.37%.

(Baking Step)

The dried solidified particles were baked under nitrogen atmosphere at 640° C. for 6 hours while stirring with a tilted rotary kiln (manufactured by Nagato Denki Kosakusho K.K.), so that composite particles in Example 1 were obtained.

The maximum displacement rate ((Dmax−D0)/d0) and the end displacement rate ((D180−D0)/d0) of the composite particles in Example 1 are summarized along with other physical properties in the following Table 1.

Example 2

Composite particles in Example 2 were obtained by the same method as in Example 1, except that the baking temperature of the solidified particles in the rotary kiln was changed to 680° C.

The maximum displacement rate ((Dmax−D0)/d0) and the end displacement rate ((D180−D0)/d0) of the composite particles in Example 2 are summarized along with other physical properties in the following Table 1.

Example 3

Composite particles in Example 3 were obtained by the same method as in Example 1, except that the solidified particles were baked under air atmosphere at 300° C. for 6 hours using a dryer with forced hot air circulation system (SPHH-202 manufactured by ESPEC Corp.) in the baking step.

The maximum displacement rate ((Dmax−D0)/d0) and the end displacement rate ((D180−D0)/d0) of the composite particles in Example 3 are summarized along with other physical properties in the following Table 1.

Example 4

(Seed Particle Forming Step)

In a 2-L glass container, 180 g of MTMS and 1800 g of deionized water as raw material were accommodated and stirred at about 200 rpm. After 3 hours, a homogeneous solution was obtained. To the homogeneous solution, 18 g of 1 normal aqueous ammonia was added to prepare a raw material solution. Using the raw material solution, seed particles were grown to determine the growth stopping time. The raw material solution became cloudy within a few tens of seconds after addition of the aqueous ammonia, with particle nuclei having occurred in the liquid. The growth of particle diameter of the seed particles stopped after 20 minutes from emergence of the cloudiness in the raw material solution. The growth stopping time is 20 minutes.

The synthesis time of particles in the seed particle forming step in Example 4 was set to 50% of the growth stopping time, or, in other words, set to 10 minutes.

Using the same raw material solution described above, synthesis was performed for 10 minutes to form seed particles, so that a seed particle liquid was obtained. The particle diameter of the seed particles determined from an optical microscope image was about 2.1 μm.

(Particle Growing Step)

In a 20-L reaction vessel, 17955 g of water, 1800 g of MTMS, and 45 g of 1% ammonium dodecyl sulfate aqueous solution were stirred to prepare a solution for growing particles. To the solution for growing particles, the whole amount of the seed particle liquid was added and stirred at about 80 rpm, while confirming the particle diameter with an optical microscope as needed. Thereby the seed particles grew, so that grown particles were obtained. In the particle growing step, the concentration of ammonia reached 0.0008 mol/L.

After a lapse of about 1 hour, the growth of particle diameter stopped. At this time, 50 g of 25 mass % aqueous ammonia was added so that the particles were aged. The particles were solidified to obtain solidified particles. Separation, washing and drying of the particles were then performed by the same method as in Example 1, so that dried solidified particles were obtained. The dried solidified particles had an average particle diameter of 4.53 μm and a CV value of 1.68%.

(Baking Step)

The dried solidified particles were baked under the same conditions as in Example 1, so that composite particles in Example 4 were obtained. The maximum displacement rate ((Dmax−D0)/d0) and the end displacement rate ((D180−D0)/d0) of the composite particles in Example 4 are summarized along with other physical properties in the following Table 1.

Example 5

(Seed Particle Forming Step)

In a 2-L glass container, 180 g of MTMS, 1800 g of deionized water, and 0.1 g of dodecyl sodium sulfate were accommodated as raw material and stirred at about 200 rpm. After 3 hours, a homogeneous solution was obtained. To the homogeneous solution, 18 g of 1 normal aqueous ammonia was added to prepare a raw material solution. Using the raw material solution, seed particles were grown to determine the growth stopping time. The raw material solution became cloudy within a few tens of seconds after addition of the aqueous ammonia, with particle nuclei having occurred in the liquid. The growth of particle diameter of the seed particles stopped after 20 minutes from emergence of the cloudiness in the raw material solution. The growth stopping time is 20 minutes.

The synthesis time of particles in the seed particle forming step in Example 5 was set to 50% of the growth stopping time, or, in other words, set to 10 minutes.

Using the same raw material solution described above, synthesis was performed for 10 minutes to form seed particles, so that a seed particle liquid was obtained. The particle diameter of the seed particles determined from an optical microscope image was about 1.1 μm.

(Particle Growing Step)

In a 20-L reaction vessel, 17955 g of water, 1800 g of MTMS, and 45 g of 1% ammonium dodecyl sulfate aqueous solution were stirred to prepare a solution for growing particles. To the solution for growing particles, the whole amount of the seed particle liquid was added and stirred at about 80 rpm, while confirming the particle diameter with an optical microscope as needed. Thereby the seed particles grew, so that grown particles were obtained. In the particle growing step, the concentration of ammonia reached 0.0008 mol/L.

After a lapse of about 1 hour, the growth of particle diameter stopped. At this time, 50 g of 25 mass % aqueous ammonia was added so that the particles were aged. The particles were solidified to obtain solidified particles. Separation, washing and drying of the particles were then performed by the same method as in Example 1, so that dried solidified particles were obtained. The dried solidified particles had an average particle diameter of 2.15 μm and a CV value of 1.98%.

(Baking Step)

The dried solidified particles were baked under the same conditions as in Example 1, so that composite particles in Example 5 were obtained. The maximum displacement rate ((Dmax−D0)/d0) and the end displacement rate ((D180−D0)/d0) of the composite particles in Example 5 are summarized along with other physical properties in the following Table 1.

Example 6

(Seed Particle Forming Step)

In a 1-L plastic container, 240 g of MTMS and 24 g of deionized water were accommodated as raw material and stirred at 30° C. and at about 200 rpm. After 3 hours, a homogeneous solution was obtained.

In a 2-L glass container, 1200 g of water and 12 g of 1 normal aqueous ammonia were accommodated, and the whole amount of the homogeneous solution was added thereto while stirring at 20° C. and at 80 rpm, so that a raw material solution was prepared. Using the raw material solution, seed particles were grown to determine the growth stopping time. The raw material solution became cloudy within a few tens of seconds after addition of the homogeneous solution, with particle nuclei having occurred in the liquid. The growth of particle diameter of the seed particles stopped after 20 minutes from emergence of the cloudiness in the raw material solution. The growth stopping time is 20 minutes.

The synthesis time of particles in the seed particle forming step in Example 6 was set to 50% of the growth stopping time, or, in other words, set to 10 minutes.

Using the same raw material solution described above, synthesis was performed for 10 minutes to form seed particles, so that a seed particle liquid was obtained. The particle diameter of the seed particles determined from an optical microscope image was about 14.8 μm.

(Particle Growing Step)

In the present Example, particle growing step was repeated three times to obtain solidified particles having a large particle diameter.

First Time

In a 2-L reaction vessel, 936 g of water, 192 g of MTMS, and 24 g of 1% ammonium dodecyl sulfate aqueous solution were stirred to prepare a solution for growing particles. To the solution for growing particles, 500 g of the seed particle liquid was added and stirred at 25° C. and at 50 rpm. At this time, the concentration of ammonia reached 0.0025 mol/L. The seed particles grew, and particles having a particle diameter of 23.7 μm were confirmed after 35 minutes.

Second Time or Later

The same operation as at the first time was performed two more times. Incidentally, the concentration of ammonia at the second time was 0.00075 mol/L, and the particle diameter obtained at the end of second time was 36.4 μm. The concentration of ammonia at the third time as final synthesis step was 0.00047 mol/L.

Aging, separation, washing and drying were then performed in the same manner as in Example 1, so that dried solidified particles were obtained. The dried solidified particles had an average particle diameter of 53.84 μm and a CV value of 2.04%.

(Baking Step)

The dried solidified particles were baked under the same conditions as in Example 1, so that composite particles in Example 6 were obtained. The maximum displacement rate ((Dmax−D0)/d0) and the end displacement rate ((D180−

D0)/d0) of the composite particles in Example 6 are summarized along with other physical properties in the following Table 1.

Example 7

(Seed Particle Forming Step)

In a 1-L plastic container, 240 g of MTMS and 16 g of deionized water were accommodated as raw material and stirred at 30° C. and at about 200 rpm. After 3 hours, a homogeneous solution was obtained.

In a 2-L glass container, 1200 g of water and 12 g of 1 normal aqueous ammonia were accommodated, and the whole amount of the homogeneous solution was added thereto while stirring at 20° C. and at 80 rpm, so that a raw material solution was prepared. Using the raw material solution, seed particles were grown to determine the growth stopping time. The raw material solution became cloudy within a few tens of seconds after addition of the homogeneous solution, with particle nuclei having occurred in the liquid. The growth of particle diameter of the seed particles stopped after 20 minutes from emergence of the cloudiness in the raw material solution. The growth stopping time is 20 minutes.

The synthesis time of particles in the seed particle forming step in Example 7 was set to 50% of the growth stopping time, or, in other words, set to 10 minutes.

Using the same raw material solution described above, synthesis was performed for 10 minutes to form seed particles, so that a seed particle liquid was obtained. The particle diameter of the seed particles determined from an optical microscope image was about 10.0 µm.

(Particle Growing Step)

In the present Example, particle growing step was repeated four times to obtain solidified particles having a large particle diameter.

First Time

In a 2-L reaction vessel, 936 g of water, 192 g of MTMS, and 24 g of 1% ammonium dodecyl sulfate aqueous solution were stirred to prepare a solution for growing particles. To the solution for growing particles, 400 g of the seed particle liquid was added and stirred at 25° C. and at 50 rpm. At this time, the concentration of ammonia reached 0.0021 mol/L. The seed particles grew, and particles having a particle diameter of 15.8 µm were confirmed after 40 minutes.

Addition (Second Time, Third Time and Fourth Time)

The same operation as at the first time was performed three more times. The concentration of ammonia at the second time was 0.00050 mol/L, and the particle diameter obtained at the end was 27.7 µm. The concentration of ammonia at the third time was 0.00037 mol/L, and the particle diameter obtained at the end was 49.5 µm. The concentration of ammonia at the fourth time as final synthesis step was 0.00016 mol/L.

Aging, separation, washing and drying were then performed in the same manner as in Example 1, so that dried solidified particles were obtained. The dried solidified particles had an average particle diameter of 106.0 µm and a CV value of 1.15%.

(Baking Step)

The dried solidified particles were baked under the same conditions as in Example 1, so that composite particles in Example 7 were obtained. The maximum displacement rate ((Dmax−D0)/d0) and the end displacement rate ((D180−D0)/d0) of the composite particles in Example 7 are summarized along with other physical properties in the following Table 1.

Example 8

(Seed Particle Forming Step)

In a 1-L plastic container, 240 g of MTMS and 16 g of deionized water were accommodated as raw material and stirred at 33° C. and at about 200 rpm. After 3 hours, a homogeneous solution was obtained.

In a 2-L glass container, 1200 g of water and 12 g of 1 normal aqueous ammonia were accommodated, and the whole amount of the homogeneous solution was added thereto while stirring at 20° C. and at 80 rpm, so that a raw material solution was prepared. Using the raw material solution, seed particles were grown to determine the growth stopping time. The raw material solution became cloudy within a few tens of seconds after addition of the homogeneous solution, with particle nuclei having occurred in the liquid. The growth of particle diameter of the seed particles stopped after 20 minutes from emergence of the cloudiness in the raw material solution. The growth stopping time is 20 minutes.

The synthesis time of particles in the seed particle forming step in Example 8 was set to 50% of the growth stopping time, or, in other words, set to 10 minutes.

Using the same raw material solution described above, synthesis was performed for 10 minutes to form seed particles, so that a seed particle liquid was obtained. The particle diameter of the seed particles determined from an optical microscope image was about 13.5 µm.

(Particle Growing Step)

In the present Example, particle growing step was repeated five times to obtain solidified particles having a large particle diameter.

First Time

In a 2-L reaction vessel, 936 g of water, 192 g of MTMS, and 24 g of 1% ammonium dodecyl sulfate aqueous solution were stirred to prepare a solution for growing particles. To the solution for growing particles, 400 g of the seed particle liquid was added and stirred at 25° C. and at 50 rpm. At this time, the concentration of ammonia reached 0.0021 mol/L. The seed particles grew, and particles having a particle diameter of 23.2 µm were confirmed after 40 minutes.

Addition (Second Time, Third Time, Fourth Time and Fifth Time)

The same operation as at the first time was performed four more times. The concentration of ammonia at the second time was 0.00050 mol/L, and the particle diameter obtained at the end was 38.6 µm. The concentration of ammonia at the third time was 0.00037 mol/L, and the particle diameter obtained at the end was 56.9 µm. The concentration of ammonia at the fourth time was 0.00035 mol/L, and the particle diameter obtained at the end was 77.7 µm. The concentration of ammonia at the fifth time as final synthesis step was 0.00015 mol/L.

Aging, separation, washing and drying were then performed in the same manner as in Example 1, so that dried solidified particles were obtained. The dried solidified particles had an average particle diameter of 156.3 µm and a CV value of 1.79%.

(Baking Step)

The dried solidified particles were baked under the same conditions as in Example 1, so that composite particles in Example 8 were obtained. The maximum displacement rate ((Dmax−D0)/d0) and the end displacement rate ((D180−

D0)/d0) of the composite particles in Example 8 are summarized along with other physical properties in the following Table 1.

Example 9

Using the composite particles obtained in Example 4 as mother particles, an electro-conductive layer was provided on the surface thereof by the following procedure to prepare electro-conductive particles.

First, metal nuclei were formed on the surface of a specified amount of composite particles. In formation of the metal nuclei, to 10 g of the composite particles immersed in 130 mL of a mixed solvent of isopropyl alcohol and methanol, 0.2 g of chloroauric acid (HAuC; $4H_2O$) and 2.6 ml of 3-aminopropyltrimethoxysilane were added, and reduction was performed with 0.084 g of sodium tetrahydroborate ($NaBH_4$).

In 475 mL of water, 10 g of the particles having metal nuclei formed on the surface were dispersed, and 28 g of polyvinylpyrrolidone, 28.65 g of silver nitrate, and 375 mL of 25 mass % aqueous ammonia solution were added thereto. The silver ions in the liquid were reduced by addition of 250 mL of 3.57 mol/L aqueous formalin solution, so that a silver coating film was formed on the surface of the composite particles. Thereby, composite particles of the present Example having a silver coating film as conductive layer were obtained. The metal thickness of the silver coating film was 0.14 μm.

The maximum displacement rate ((Dmax−D0)/d0) and the end displacement rate ((D180−D0)/d0) of the composite particles in Example 9 are summarized along with other physical properties in the following Table 2.

Example 10

Using the composite particles obtained in Example 4 as mother particles, an anchoring resin layer was provided on the surface by the following procedure to prepare anchoring particles.

(Surface Treatment with Silane Coupling Agent)

To 100 g of the composite particles obtained in Example 4, 1200 g of methanol and 500 g of 25 mass % aqueous ammonia were added to prepare a particle dispersion. To the resulting particle dispersion, 40 g of 3-methacryloxypropyl trimethoxysilane was added dropwise at 5 g/min, while stirring at 30° C. and at 100 rpm. The particle dispersion was stirred at 70° C. for 3 hours.

After stirring, the particles were separated from the liquid by a centrifuge and dispersed in methanol for decantation. After the operation was repeated several times, methanol was removed so that the particles were air dried. After air drying, the particles were heated for drying at 150° C., so that composite particles surface-treated with a silane coupling agent were obtained.

(Anchoring Layer Coating)

In a mixture of 1000 g of methanol and 2500 g of ethylene glycol, 50 g of the surface-treated composite particles were dispersed. To the resulting particle dispersion, 150 g of polyvinylpyrrolidone (PVP) was added while stirring at 30° C. and at 100 rpm. After 30 minutes from the addition, it was confirmed that the PVP was sufficiently dissolved, and then 120 g of styrene, 25 g of 2,2'-azobisisobutyronitrile, and 3 g of mercaptoacetic acid were added. The mixture was stirred at 65° C. and at 60 rpm for 8 hours.

The particles were separated from the liquid by a centrifuge and then dispersed in water for decantation. After the operation was repeated several times, the aqueous dispersion of the particles was frozen by liquid nitrogen for drying with a freeze-drying machine. Thereby, composite particles in Example 10 having a styrene layer as anchoring layer formed on the surface were obtained.

The maximum displacement rate ((Dmax−D0)/d0) and the end displacement rate ((D180−D0)/d0) of the composite particles in Example 10 are summarized along with other physical properties in the following Table 2.

Example 11

(Seed Particle Forming Step)

In a 2-L glass container, 300 g of vinyltrimethoxysilane (hereinafter abbreviated as VTMS) and 1500 g of deionized water were accommodated as raw material and stirred at about 200 rpm. After 1 hour, a homogeneous solution was obtained. To the homogeneous solution, 0.5 g of 1 normal aqueous ammonia was added to prepare a raw material solution. Using the raw material solution, seed particles were grown to determine the growth stopping time.

The raw material solution became cloudy after 17 minutes from the addition of the aqueous ammonia, with particle nuclei having occurred in the liquid. The growth of particle diameter of the seed particles stopped after 60 minutes from emergence of the cloudiness in the raw material solution. The growth stopping time is 60 minutes.

The synthesis time of particles in the seed particle forming step in Example 11 was set to 50% of the growth stopping time, or, in other words, set to 30 minutes.

Using the same raw material solution described above, synthesis was performed for 30 minutes to form seed particles, so that a seed particle liquid was obtained. The particle diameter of the seed particles determined from an optical microscope image was about 6.5 m.

(Particle Growing Step)

In a 5-L reaction vessel, 1350 g of water, 500 g of VTMS, and 150 g of 1% ammonium dodecyl sulfate aqueous solution were stirred to prepare a solution for growing particles. To the solution for growing particles, 1050 g of the seed particle liquid and 0.1 g of 1 normal aqueous ammonia were added and stirred at about 80 rpm, while confirming the particle diameter with an optical microscope as needed. The seed particles grew, so that grown particles were obtained. In the particle growing step, the concentration of ammonia reached 0.00013 mol/L.

After a lapse of about 3 hours, the growth of particle diameter stopped. At this time, 10 g of 25 mass % aqueous ammonia was added so that the particles were aged. The particles were solidified to obtain solidified particles. Solid-liquid separation was performed by decantation and washing with methanol was performed three times. Subsequently, natural drying was performed for 2 days and heating at 80° C. was further performed, so that dried solidified particles were obtained. The dried solidified particles had an average particle diameter of 11.12 μm and a CV value of 1.85%.

(Baking Step)

The dried solidified particles were baked under nitrogen atmosphere at 200° C. for 6 hours while stirring in the same rotary kiln as described above, so that composite particles in Example 11 were obtained.

The maximum displacement rate ((Dmax−D0)/d0) and the end displacement rate ((D180−D0)/d0) of the composite particles in Example 11 are summarized along with other physical properties in the following Table 1.

Example 12

Composite particles in Example 12 were obtained by the same method as in Example 1, except that the synthesis time of particles in the seed particle forming step was set to 80% of the growth stopping time.

The maximum displacement rate ((Dmax−D0)/d0) and the end displacement rate ((D180−D0)/d0) of the composite particles in Example 12 are summarized along with other physical properties in the following Table 1.

Comparative Example 1

Composite particles in Comparative Example 1 were obtained by the same method as in Example 1, except that baking at 360° C. in the air atmosphere for 6 hours was performed using a muffle furnace (KBF728N manufactured by Koyo Thermo Systems Co., Ltd.) in the baking step.

The maximum displacement rate ((Dmax−D0)/d0) and the end displacement rate ((D180−D0)/d0) of the composite particles in Comparative Example 1 are summarized along with other physical properties in the following Table 3.

Comparative Example 2

Composite particles in Comparative Example 2 were prepared by a conventional two-layer method.

In a 2-L glass container, 1600 g of deionized water and 1 g of 25 mass % aqueous ammonia were accommodated and stirred at about 20 rpm. Thereto, 160 g of MTMS was gradually added, so that an MTMS phase was formed on an aqueous phase containing ammonia. In the present synthesis, the concentration of ammonia reached 0.008 mol/L.

After a lapse of 5 hours, the MTMS phase disappeared to achieve homogeneity. Thereto, 10 g of 25 mass % aqueous ammonia was added and the particles were aged. Subsequently, separation, washing and drying of the particles were performed by the same method as in Example 1, so that dried solidified particles were obtained. The dried solidified particles had an average particle diameter of 4.58 μm and a CV value of 1.83%.

The dried solidified particles were baked under the same conditions as in Example 1, so that composite particles in Comparative Example 2 were obtained. The maximum displacement rate ((Dmax−D0)/d0) and the end displacement rate ((D180−D0)/d0) of the composite particles in Comparative Example 2 are summarized along with other physical properties in the following Table 3.

Comparative Example 3

According to a conventional homogenization method, composite particles in Comparative Example 3 were prepared.

In a 1-L plastic container, 360 g of MTMS and 48 g of deionized water were accommodated and stirred at about 200 rpm. After a lapse of 3 hours, a homogeneous MTMS aqueous solution was obtained.

In a 2-L glass container, 1800 g of water and 18 g of 1 normal aqueous ammonia were accommodated and the whole amount of the MTMS aqueous solution was added thereto. The concentration of ammonia in the resulting mixture reached 0.008 mol/L.

After a lapse of about 1 hour, the growth of the particle diameter stopped. At this time, 10 g of 25 mass % aqueous ammonia was added and the particles were aged. Subsequently, separation, washing and drying of the particles were performed by the same method as in Example 1, so that dried solidified particles were obtained. The dried solidified particles had an average particle diameter of 6.05 μm and a CV value of 1.47%.

The dried solidified particles were baked under the same conditions as in Example 1, so that composite particles in Comparative Example 3 were obtained. The maximum displacement rate ((Dmax−D0)/d0) and the end displacement rate ((D180−D0)/d0) of the composite particles in Comparative Example 3 are summarized along with other physical properties in the following Table 3.

TABLE 1

|  |  | Example | | | | | |
| --- | --- | --- | --- | --- | --- | --- | --- |
|  |  | 1 | 2 | 3 | 4 | 5 | 6 |
| Seed particle forming step | Raw material (Silicon compound) | MTMS | MTMS | MTMS | MTMS | MTMS | MTMS |
|  | Time until start of clouding | Few tens of seconds | Few tens of seconds | Few tens of seconds | Few tens of seconds | Few tens of seconds | Few tens of seconds |
|  | Growth stopping time | 20 minutes | 20 minutes | 20 minutes | 20 minutes | 20 minutes | 20 minutes |
|  | Seed particle synthesis time | 10 minutes | 10 minutes | 10 minutes | 10 minutes | 10 minutes | 10 minutes |
| Particle growing step | Final concentration of catalyst (mol/L) | 0.0006 | 0.0006 | 0.0006 | 0.0008 | 0.0008 | 0.0005 |
| Baking step | Baking atmosphere | $N_2$ | $N_2$ | Air | $N_2$ | $N_2$ | $N_2$ |
|  | Baking temperature (° C.) | 640 | 680 | 300 | 640 | 640 | 640 |
| Fundamental physical properties | Particle diameter d0 (μm) | 15.78 | 15.17 | 16.37 | 4.38 | 2.079 | 52.2 |
|  | CV value (%) | 1.35 | 1.38 | 1.43 | 1.63 | 1.80 | 1.85 |
|  | 10% Compressive elastic modulus (GPa) | 6.25 | 13.83 | 3.01 | 2.51 | 3.52 | 3.92 |
| Creep deformation | Load F (mN) | 19.6 | 39.2 | 9.8 | 0.98 | 0.49 | 137.2 |
|  | Displacement ratio (%) | 10.2 | 9.8 | 9.9 | 10.6 | 14.4 | 9.7 |
|  | Start displacement Ds (μm) | 1.617 | 1.490 | 1.624 | 0.464 | 0.299 | 5.060 |
|  | Maximum displacement Dmax (μm) | 1.648 | 1.508 | 1.624 | 0.476 | 0.309 | 5.090 |
|  | End displacement D180 (μm) | 1.648 | 1.502 | 1.611 | 0.470 | 0.309 | 5.072 |
|  | (Dmax − Ds)/d0 (%) | 0.2 | 0.1 | 0 | 0.3 | 0.5 | 0.1 |
|  | (D180 − Ds)/d0 (%) | 0.2 | 0.1 | −0.1 | 0.1 | 0.5 | 0 |

TABLE 1-continued

|  |  | Example | | | |
|---|---|---|---|---|---|
|  |  | 7 | 8 | 11 | 12 |
| Seed particle forming step | Raw material (Silicon compound) | MTMS | MTMS | VTMS | MTMS |
|  | Time until start of clouding | Few tens of seconds | Few tens of seconds | 17 minutes | Few tens of seconds |
|  | Growth stopping time | 20 minutes | 20 minutes | 60 minutes | 20 minutes |
|  | Seed particle synthesis time | 10 minutes | 10 minutes | 30 minutes | 16 minutes |
| Particle growing step | Final concentration of catalyst (mol/L) | 0.0002 | 0.0001 | 0.0001 | 0.0006 |
| Baking step | Baking atmosphere | $N_2$ | $N_2$ | $N_2$ | $N_2$ |
|  | Baking temperature (° C.) | 640 | 640 | 200 | 640 |
| Fundamental physical properties | Particle diameter d0 (μm) | 102.7 | 150.0 | 9.10 | 16.16 |
|  | CV value (%) | 1.05 | 1.33 | 1.88 | 1.22 |
|  | 10% Compressive elastic modulus (GPa) | 3.20 | 3.31 | 4.85 | 6.23 |
| Creep deformation | Load F (mN) | 411.6 | 931 | 3.92 | 20.1 |
|  | Displacement ratio (%) | 9.7 | 10.1 | 9.3 | 10.0 |
|  | Start displacement Ds (μm) | 9.991 | 15.198 | 0.842 | 1.616 |
|  | Maximum displacement Dmax (μm) | 10.004 | 15.277 | 0.861 | 1.664 |
|  | End displacement D180 (μm) | 9.924 | 15.277 | 0.842 | 1.664 |
|  | (Dmax − Ds)/d0 (%) | 0 | 0.1 | 0.2 | 0.3 |
|  | (D180 − Ds)/d0 (%) | −0.1 | 0.1 | 0 | 0.3 |

TABLE 2

|  |  | Example 9 | Example 10 |
|---|---|---|---|
| Coating treatment | Mother particle | Example 4 | Example 4 |
|  | Functional layer | Conductive layer | Anchoring layer |
| Fundamental physical properties | Particle diameter d0 (μm) | 4.52 | 4.88 |
|  | CV value (%) | 1.71 | 1.83 |
|  | 10% Compressive elastic modulus (GPa) | 2.48 | 2.22 |
| Creep deformation | Load F (mN) | 0.98 | 0.98 |
|  | Displacement ratio (%) | 8.8 | 8.1 |
|  | Start displacement Ds (μm) | 0.397 | 0.397 |
|  | Maximum displacement Dmax (μm) | 0.405 | 0.412 |
|  | End displacement D180 (μm) | 0.405 | 0.412 |
|  | (Dmax − Ds)/d0 (%) | 0.2 | 0.3 |
|  | (D180 − Ds)/d0 (%) | 0.2 | 0.3 |
| Surface function | Conductivity: electrical resistance value (Ω) | 2.5 | — |
|  | Adhesion: anchoring ratio (%) | — | 100 |

TABLE 3

|  |  | Comparative Example | | |
|---|---|---|---|---|
|  |  | 1 | 2 | 3 |
| Seed particle forming step | Raw material (Silicon compound) | MTMS | MTMS | MTMS |
|  | Time until start of clouding | Few tens of seconds | 23 minutes | Few tens of seconds |
|  | Growth stopping time | 20 minutes | — | — |
|  | Seed particle synthesis time | 10 minutes | 5 hours | 30 minutes |
| Particle growing step | Final concentration of catalyst (mol/L) | 0.0006 | 0.008 | 0.008 |
| Baking step | Baking atmosphere | Air | $N_2$ | $N_2$ |
|  | Baking temperature (° C.) | 360 | 640 | 640 |
| Fundamental physical properties | Particle diameter d0 (μm) | 13.95 | 4.42 | 5.71 |
|  | CV value (%) | 1.43 | 1.82 | 1.45 |
|  | 10% Compressive elastic modulus (GPa) | 25.69 | 2.78 | 2.83 |
| Creep deformation | Load F (mN) | 34.3 | 0.98 | 0.98 |
|  | Displacement ratio (%) | 7.3 | 9.5 | 9.3 |
|  | Start displacement Ds (μm) | 1.019 | 0.421 | 0.531 |
|  | Maximum displacement Dmax (μm) | 1.178 | 0.477 | 0.598 |
|  | End displacement D180 (μm) | 1.166 | 0.477 | 0.598 |
|  | (Dmax − Ds)/d0 (%) | 1.3 | 1.3 | 1.2 |
|  | (D180 − Ds)/d0 (%) | 1.2 | 1.3 | 1.2 |

As shown in Table 1, when a specified load was applied to the composite particles in Examples 1 to 8, 11 and 12, both of the maximum displacement rate ((Dmax−D0)/d0) and the end displacement rate ((D180−D0)/d0) are 1% or less. These composite particles have small creep deformation, achieving excellent long-term reliability.

In Examples 1 to 8, 11 and 12, seed particles were formed and grown, so that an associated body was formed by organic group portion in grown particles. In any cases, the final catalyst concentration in the particle growing step was relatively small, i.e., 0.0008 mol/L or less. Moreover, in Examples 1 to 8, 11 and 12, baking was performed under conditions allowing the Si—C bond to be maintained, so that flexibility was able to be maintained.

As shown in Table 2, in the case where a functional layer was provided using the composite particles in Example 4 as mother particles (Examples 9 and 10), both of the maximum displacement rate and the end displacement rate were kept at 1% or less, though there existed some variations. It is shown that the composite particles provided with a conductive layer in Example 9 have an appropriate conductivity, and the composite particles provided with an anchoring layer in Example 10 have excellent adhesion.

As shown in Table 3, when a specified load was applied to the composite particles in Comparative Examples 1 to 3, both of the maximum displacement rate ((Dmax−D0)/d0) and the end displacement rate ((D180−D0)/d0) are more than 1%. It is presumed that the composite particles in Comparative Example 1 failed to maintain the flexibility due to excessive loss of organic group portion in the raw material (MTMS) resulting from baking in the air atmosphere at 360° C.

The composite particles in Comparative Example 2 were manufactured by a conventional two-layer method, and the composite particles in Comparative Example 3 were manufactured by a conventional homogenization method. In Comparative Examples 2 and 3, the synthesis time of the seed particles was set independently from the growth stopping time. Moreover, the final amount of the catalyst in the particle growing step was large, i.e., 0.008 mol/L. It is therefore presumed that in Comparative Examples 2 and 3, the growth of the seed particles was complete, so that a dense Si—O skeleton was formed in the seed particles. In that case, even when baking is performed in conditions allowing the Si—C bond to be maintained (under nitrogen atmosphere at 640° C.), flexible particles with a sparse Si—O skeleton such as composite particles in Examples are unable to be obtained.

The composite particles in the present embodiment can be applied to any use for maintaining a gap between an upper and a lower substrate at a fixed distance. The composite particles can be widely used as, for example, a gap holding material for liquid crystal display elements including polymer dispersion liquid crystals and 3D shutters, semiconductor devices such as organic EL and LED, adhesives, anisotropic conductive films, and pressure sensors.

The composite particles of the present embodiment are particularly effective in members for use under environment to which a load is applied in a medium to long term such as touch panels, portable devices, flexible devices and wearable devices such as watches.

The invention claimed is:

1. Organic-inorganic composite particles obtained by stirring a raw material solution containing a silicon compound in which a non-hydrolyzable organic group and a hydrolyzable organic group are bonded to a silicon atom and containing a catalyst, to hydrolyze and condense the silicon compound to thereby form seed particles comprising a polyorganosiloxane having a Si—C bond wherein a synthesis time in forming the seed particle is limited to 40 to 80% of a growth stopping time of the seed particles; growing the seed particles to obtain grown particles, and then solidifying and drying the grown particles to thereby obtain dried solidified particles; and baking the dried solidified particles while maintaining the Si—C bond, that comprise a compound having a siloxane bond and that have a particle diameter d0, wherein when a load is applied such that an amount of displacement Ds satisfies $0.08d0 \leq Ds \leq 0.15d0$ and is held for 180 seconds, conditions of the following Formulae (1) and (2) are satisfied:

$$(D180-Ds)/d0 \leq 1\% \quad \text{Formula (1); and}$$

$$(Dmax-Ds)/d0 \leq 1\% \quad \text{Formula (2)},$$

wherein d0 is an average particle diameter, D180 is an amount of displacement of a particle diameter after 180 seconds of application of the load, and Dmax is a maximum amount of displacement of the particle diameter during the 180 seconds.

2. The organic-inorganic composite particles according to claim 1, having a 10% compressive elastic modulus of 2 to 20 GPa.

3. The organic-inorganic composite particles according to claim 1, wherein the average particle diameter is 0.5 to 200 μm, and a CV value which is a coefficient of variation of a particle size distribution is 5% or smaller.

4. The organic-inorganic composite particles according to claim 1, wherein the surface of the particles is covered with an electro-conductive layer.

5. The organic-inorganic composite particles according to claim 1, wherein the surface of the particles is covered with an anchoring layer.

6. A method for producing organic-inorganic composite particles that comprise a compound having a siloxane bond, the method comprising the steps of:
stirring a raw material solution containing a silicon compound in which a non-hydrolyzable organic group and a hydrolyzable organic group are bonded to a silicon atom and containing a catalyst, to hydrolyze and condense the silicon compound to thereby form seed particles comprising a polyorganosiloxane having a Si—C bond wherein a synthesis time in forming the seed particle is limited to 40 to 80% of a growth stopping time of the seed particles;
growing the seed particles to obtain grown particles, and then solidifying and drying the grown particles to thereby obtain dried solidified particles; and
baking the dried solidified particles while maintaining the Si—C bond.

7. The method for producing organic-inorganic composite particles according to claim 6, wherein the non-hydrolyzable organic group is selected from the group consisting of an alkyl group having 1 to 20 carbon atoms, an alkenyl group having 2 to 20 carbon atoms, an aryl group having 6 to 20 carbon atoms, and an aralkyl group having 7 to 20 carbon atoms; and the hydrolyzable organic group is an alkoxy group having 1 to 6 carbon atoms.

8. The method for producing organic-inorganic composite particles according to claim 6, wherein the catalyst is ammonia.

9. The method for producing organic-inorganic composite particle according to claim 6, wherein the seed particles are grown in the presence of a surfactant.

10. The method for producing organic-inorganic composite particles according to claim 6, wherein the dried solidified particles are baked under an inert atmosphere or in a vacuum.

11. Organic-inorganic composite particles that comprise a compound having a siloxane bond and that have a particle diameter d0, wherein when a load is applied such that an amount of displacement Ds satisfies $0.08d0 \leq Ds \leq 0.15d0$ and is held for 180 seconds, conditions of the following Formulae (1) and (2) are satisfied:

$$(D180-Ds)/d0 \leq 1\% \quad \text{Formula (1); and}$$

$$(Dmax-Ds)/d0 \leq 1\% \quad \text{Formula (2),}$$

wherein d0 is an average particle diameter, D180 is an amount of displacement of a particle diameter after 180 seconds of application of the load, and Dmax is a maximum amount of displacement of the particle diameter during the 180 seconds, and wherein the surface of the particles is covered with an electro-conductive layer.

12. Organic-inorganic composite particles that comprise a compound having a siloxane bond and that have a particle diameter d0, wherein when a load is applied such that an amount of displacement Ds satisfies $0.08d0 \leq Ds \leq 0.15d0$ and is held for 180 seconds, conditions of the following Formulae (1) and (2) are satisfied:

$$(D180-Ds)/d0 \leq 1\% \quad \text{Formula (1); and}$$

$$(Dmax-Ds)/d0 \leq 1\% \quad \text{Formula (2),}$$

wherein d0 is an average particle diameter, D180 is an amount of displacement of a particle diameter after 180 seconds of application of the load, and Dmax is a maximum amount of displacement of the particle diameter during the 180 seconds, and wherein the surface of the particles is covered with an anchoring layer.

13. A method for producing organic-inorganic composite particles that comprise a compound having a siloxane bond, the method comprising the steps of:

stirring a raw material solution containing a silicon compound in which a non-hydrolyzable organic group and a hydrolyzable organic group are bonded to a silicon atom and containing a catalyst, to hydrolyze and condense the silicon compound to thereby form seed particles comprising a polyorganosiloxane having a Si—C bond;

growing the seed particles to obtain grown particles, and then solidifying and drying the grown particles to thereby obtain dried solidified particles; and baking the dried solidified particles under an inert atmosphere or in a vacuum while maintaining the Si—C bond.

* * * * *